United States Patent [19]

Van der Aa

[11] 3,730,319
[45] May 1, 1973

[54] GEAR BOX AND CLUTCH ASSEMBLY

[75] Inventor: Hendrick Van der Aa, Pierre Fonds, Canada

[73] Assignee: Arlen Mills Inc., Montreal, Quebec, Canada

[22] Filed: Feb. 23, 1971

[21] Appl. No.: 117,887

[30] Foreign Application Priority Data

June 11, 1970 Canada............................085,233

[52] U.S. Cl. ......................192/95, 87/18, 192/99 S, 192/110 B
[51] Int. Cl............................................F16d 19/00
[58] Field of Search...................192/99 S, 98, 110 B, 192/85 CA, 95; 87/18

[56] References Cited

UNITED STATES PATENTS

| 2,185,714 | 1/1940 | Scherer | 192/95 |
| 3,101,642 | 8/1963 | Beckwith, Jr. | 87/18 |
| 1,668,668 | 5/1928 | Beemer | 192/110 B |
| 1,864,126 | 6/1932 | Ferris | 192/85 CA |

Primary Examiner—Charles J. Myhre
Assistant Examiner—Randall Heald
Attorney—Cushman, Darby & Cushman

[57] ABSTRACT

A gear box and clutch assembly is described for selectively transmitting a torque from a source of power to a main shaft of a braiding machine. The gear box contains a pulley shaft which supports a driving gear and a clutch mechanism, and a driven gear is supported on the main shaft in engagement with the driving gear. This driving gear is movable relative to the pulley shaft to engage the clutch mechanism thus enabling the braiding machine to be drivingly coupled to the source of power. An actuator device is provided which is movable coaxially of the pulley shaft in order to bring the driving gear into engagement with the clutch mechanism. This actuator device preferably comprises a cylindrical body member that has a blind borehole coaxially of the same. The borehole is adapted to rotatably support one end of the pulley shaft and is of a depth sufficient to accommodate the movement of the actuator device which effects engagement of the driving gear and clutch mechanism. It is also preferable that the actuator device be provided with a thrust bearing thereon which engages one face of the driving gear at several points concentrically thereof, in order to uniformly restrain a load on this gear. In this way, elimination of an eccentrically applied load to the driving gear is achieved. As a result excessive wear and premature failure of the driving gear can be successfully avoided. Although specifically described with reference to a braiding machine, the present gearbox and clutch assembly could be used elsewhere as well.

4 Claims, 3 Drawing Figures

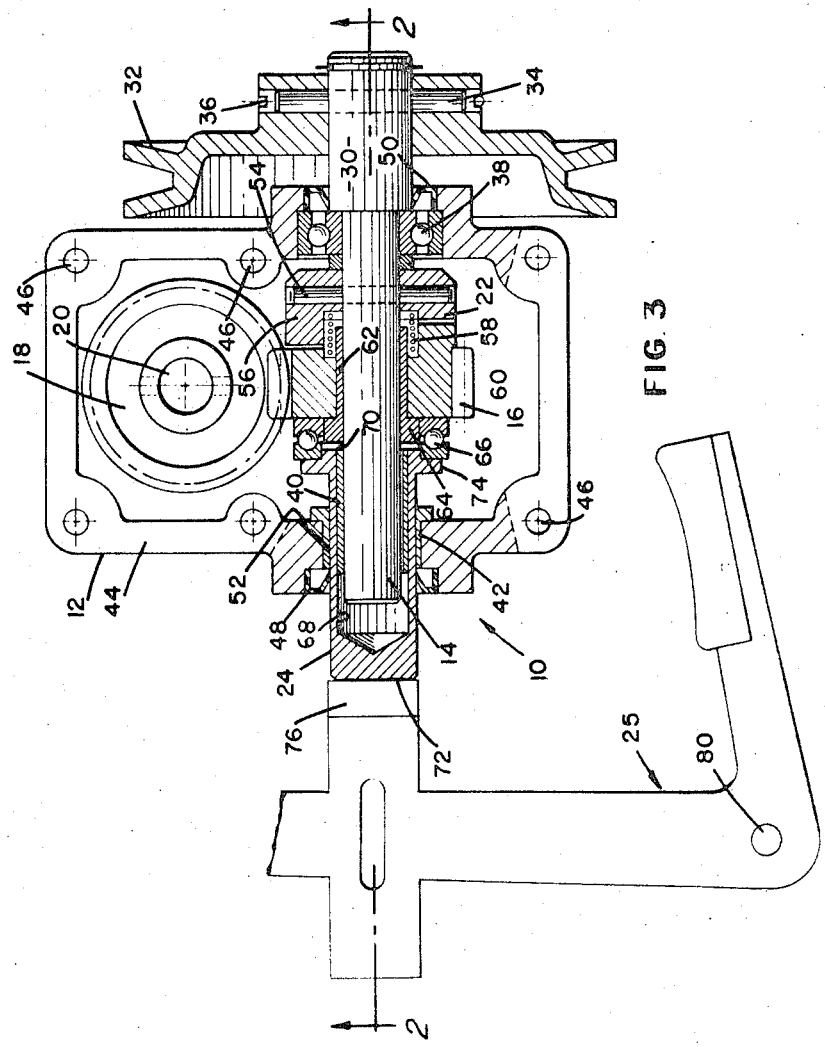

GEAR BOX AND CLUTCH ASSEMBLY

This invention relates to a gear box in general terms, and in particular, to a gear box and clutch assembly that are adapted to selectively drive the main shaft of a braiding machine from a source of power. This gear box has a driving gear that is movably supported upon a pulley shaft which is rotated by a torque derived from the source of power. Moreover, this driving gear is actuated or moved by an uniformly applied load, because of contact at a multiplicity of locations concentrically of the same with a gear actuator device which operatively couples the driving gear and the clutch mechanism.

BACKGROUND OF THE INVENTION

The function of a gear box to enable the selective transmission of power from a suitable source to a braiding machine is well known in this art. It is also known that a braiding machine produces braided material from threads provided on bobbins, and that such threads are somewhat prone to breakage because of their low strength characteristics. Whenever breakage of a thread in a braiding machine does occur, it is highly desirable to stop the braiding machine immediately, i.e., uncouple the main shaft of the braiding machine from the source of power from which it is being driven. This is the function of a gear box of the type contemplated herein. When, on the other hand, no breakage of thread occurs in the braiding machine it is desirable to continue running as long as possible.

In normal practice when a braiding machine is being started up, as at the beginning of a working day or "shift", it is necessary to couple the main shaft of that braiding machine to a suitable source of power. That source of power might be a main drive shaft in some drive train, or it might be an individually operated electric motor. In any event, it is necessary to activate the gear box associated with the braiding machine, and move the driving gear therein so that it is drivingly coupled to a clutch assembly provided on the same pulley shaft which supports the driving gear. In the past, various fork-like mechanisms and devices have been used as a means for actuating or moving the driving gear. In those earlier attempts, as represented, for instance, by U.S. Pat. No. 3,101,642 issued to W.L. Beckwith, Jr. on Aug. 27, 1963, the driving gear is movable into an operative position by means of an eccentrically applied activating load. Despite the provision of adequate grease or other types of lubrication within the Beckwith gear box, this eccentrically applied load on the driving gear will invaribaly result in excessive wear on the bearings, and ultimately to gear "chatter" and probably complete failure of the gear box. Despite the fact that various structures and arrangements have been used for actuating the driving gear, none of the previous structures has proven to be entirely satisfactory. In brief, these difficulties have usually manifested themselves in a very short working life of the gear box structure. As a result, the previous gear box arrangements were costly from the point of view of repair and maintenance, as well as lost production because of "down time" when the braiding machine was not in operation.

SUMMARY OF THE INVENTION

The present invention is directed to a gear box and clutch assembly in which many of the prior art difficulties have been avoided. The material below will describe one preferred embodiment encompassed by the present invention, and will make some suggestions for alternative arrangements within the spirit thereof. In a broad sense, there is provided in a gear box adapted to selectively drive the main shaft of a braiding machine, said gear box having a pulley shaft therein that can be rotatably driven from a source of power, a driving gear mounted on the pulley shaft to be rotatably and axially movable relative thereto, a clutch mechanism for selectively interconnecting the driving gear and the pulley shaft in driving relation, and a driven gear supported in the gear box on said main shaft, the improvement comprising an actuator device disposed to project into the gear box coaxially of the pulley shaft therein, and being movably supported to effect operative engagement of the driving gear and clutch mechanism, whereby said source of power is selectively and drivingly coupled to the braiding machine. The actuator device preferably comprises a cylindrical body member that has a blind borehole therein adapted to receive and rotatably support one end of the pulley shaft. It is also highly preferable that this actuator device be provided with a thrust bearing thereon, since the driving and driven gears are usually helical gears which inherently generate a force component axially of the pulley shaft. The thrust bearing on the actuator device will absorb and resist that force component. The thrust bearing could alternatively be provided elsewhere, other than on the actuator device, but other arrangements would be more complex and difficult to assemble. The blind borehole in the cylindrical body member is sufficiently deep to accommodate the movement of the actuator device coaxially of the pulley shaft that effects engagement of the driving gear and clutch mechanism.

It is therefore an object of this invention to provide an improved gear box and clutch assembly that is adapted to selectively drive the main shaft of a braiding machine from a suitable source of power. In a preferred embodiment the present invention provides an actuator device which is disposed to be movable coaxially of the pulley shaft in the gear box.

It is another object of this invention to provide an improved actuator device for the gear box and clutch assembly of the braiding machine, wherein the actuator device is preferably a cylindrical body member having a blind borehole therein for receiving and rotatably supporting one end of the pulley shaft. Such an actuator device engages one face of the driving gear at several points located concentrically of that gear in order to eliminate any eccentrically applied load to that gear. In this way, an improved working life is obtained both for the driving gear and for the gear box overall. Proper adequate lubrication of the moving parts is provided with no unusual lubricating techniques being necessary.

DESCRIPTION OF THE DRAWINGS

These and other objects and features of the invention will become apparent from the following detailed description when considered in conjunction with the accompanying drawings. These drawings illustrate by way of example only, one preferred embodiment of the gear box and clutch assembly according to the present invention, wherein:

FIG. 3 is also a top plan view taken in section centrally of the gear box and clutch assembly of FIG. 1.

DESCRIPTION OF A PREFERRED EMBODIMENT

Figure 1:
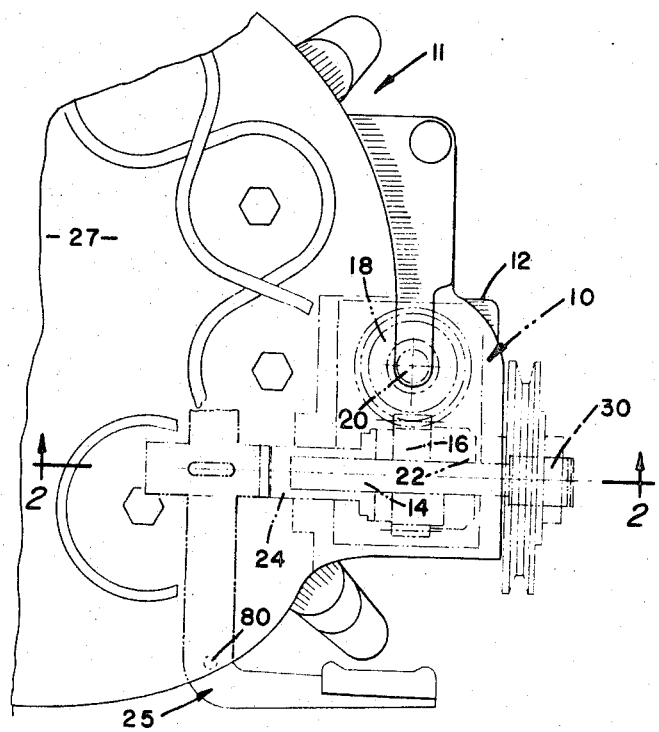
FIG. 1 is a top plan view showing in part the table of a conventional braiding machine with the present invention incorporated therein.

In the accompanying drawings wherein like numerals represent the same part, the present gear box and clutch assembly is shown overall at 10, as being an operative part of a braiding machine 11. In brief, this assembly 10 comprises a bear box housing 12 in which there is mounted a pulley shaft 14. A driving gear 16 is mounted on this pulley shaft 14 and is adapted to engage a driven gear 18 supported within the gear box housing 12 upon a shaft 20. This shaft 20 is shown to be vertically disposed in FIG. 1, and is usually the main driving shaft of the braiding machine 11. A clutch mechanism is indicated at 22, and is fixedly secured to the pulley shaft. An actuator device 24 is provided coaxially of the pulley shaft in order to move the driving gear into operative engagement with the clutch mechanism 22, when it is desired. Associated with the gear actuator 24 is an activating lever assembly indicated at 25. It will also be apparent from FIG. 1 that the gear box and clutch assembly 10 is disposed beneath a work table 27 of the braiding machine 11. Since the particular details of the structure and operation of the braiding machine 11 will be known to those familiar with this art, a detailed description of the same need not be given at this time. It will suffice simply to state that the present gear box and clutch assembly 10 serves to selectively couple the main shaft 20 of the braiding machine 11 to a suitable source of power (not shown in FIG. 1).

One end portion of the pulley shaft 14 is enlarged as shown at 30, and has a conventional V-type pulley 32 fixedly secured thereto by means of a shear pin 34. A retaining ring 36 is usually provided in order to retain shear pin 34 in its operative position. This retaining ring 36 is, of course, usually located within a slot as will be recognized by those familiar with this art. The pulley 32 is usually connected by a conventional pulley belt, not shown, to either a main drive shaft or preferably to an individually operated electric motor, or other similar power source. As an alternative to the use of a pulley such as that at 32, a spur gear might be mounted on the end 30 of the pulley shaft in order to couple that shaft through a suitable gear train to the power source.

Figure 2:
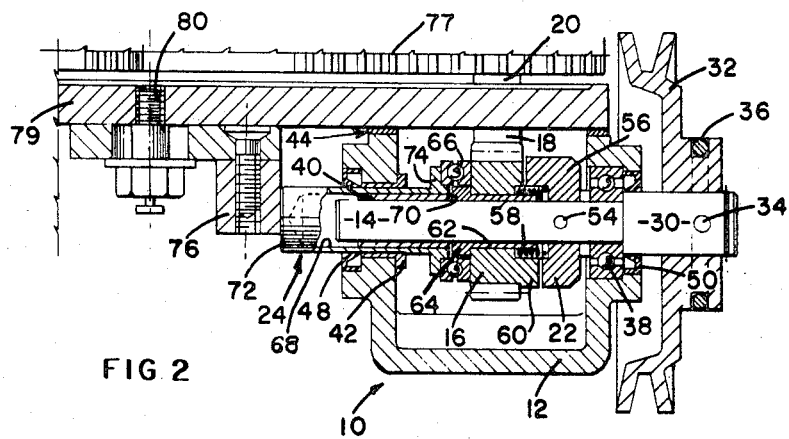
FIG. 2 is an elevation view taken in vertical cross-section along line 2—2 of FIG. 1.

The pulley shaft 14 is mounted in the gear box housing 12 for rotation by means of a ball bearing 38 which is positioned abutting against the shoulder defined by enlarged end portion 30, and a pair of bronze bushings 40 and 42 that are respectively disposed interiorly and exteriorly of the actuator device 24. This will be described in further detail below, It should be noted at this point that the gear box housing 12 is attached to the bottom of Plate 79 shown in FIG. 2. Suitable sealing means such as a gasket 44 would be provided to enable the gear box housing 12 to be tightly joined by screws, bolts or other such fastening means received in boreholes 46. Oil seals 48 and 50 are also provided in connection with the bearings 38, 40 and 42 and are built and designed to operate in a manner well known in this art. It should also be noted that oil and lubrication openings such as that suggested at 52 are also provided in the gear box housing 12.

The clutch mechanism 22 in this instance preferably comprises a dog-type of clutch that is fixedly secured to pulley shaft 14 by means of a locking pin 54. This locking pin 54 is closely received in a suitable borehole extending transversely of the pulley shaft 14. The clutch mechanism 22 is provided with at least one dog 56 and a compression spring 58. In cooperation therewith, one face of the driving gear 16 is provided with at least one dog 60 that is adapted to operatively engage the dog 56 on clutch mechanism 22. The compression spring 58 normally maintains the dogs 56 and 60 disengaged, and hence a force is needed to overcome the spring force of compression spring 58 before the driving gear 16 and the mechanism 22 are drivingly coupled. The driving gear 16 is supported on the pulley shaft 14 by means of a bronze bushing 62. This bushing 62 enables the driving gear 16 to be movable both axially and rotatably relative to the pulley shaft. Axial motion of the driving gear 16 is necessary to enable the gear and clutch mechanism 22 to be brought into engagement and moved out of engagement, as desired. The rotational movement of driving gear 16 relative to the pulley shaft 14 occurs when the driving gear and clutch mechanism 22 are disengaged. Since the driving and driven gears are normally helical gears and are always in engagement, uncoupling of the driving gears 16 and clutch mechanism 22 will enable the frictional forces inherent in the gear system to cause the gear 16 and bushing 62 to be stationary relative to the rotating pulley shaft 14.

The other face of the driving gear 16, opposite the dog 60, abuts against a peripherally extending flange 64 extending radially outwardly of the bronze bushing 62, and against a thrust bearing 66. One half of the thrust bearing 66 is shrink-fitted onto the flange 64 and contacts or engages the other face of the driving gear 16 at numerous locations spaced concentrically of the driving gear. Ideally, these points of contact are in effect an annular area of contact. In this way any loads transferred between the driving gear 16 and thrust bearing 66 are applied coaxially of the pulley shaft 14 and uniformly and concentrically of the face of the driving gear. It will be apparent that because the driving gear 16 and driven gear 18 are both of a spiral or helical type, when power is being transmitted through the same, a force component is generated coaxially directed relative to pulley shaft 14. Hence, thrust bearing 66 is conveniently provided in the location and orientation shown in the drawings. It is especially important to recognize that because the thrust bearing 66 is a circular bearing, being in contact over an annular area of the face of driving gear 16, the possibility for all practical purposes, of an eccentrically applied load on the gear 16, is eliminated.

The actuator device 24 is preferably cylindrical in form, as shown, and comprises a body member that has a blind borehole 68 therein, adapted to receive and support both the bronze bushing 40 and the other end of the pulley shaft 14. This blind borehole 68 defines an open end 70 and a closed end 72 on the actuator device 24. The open end 70 has associated with it a radially outwardly extending flange 74 which is provided with a step on which the other half of thrust bearing 66 is also shrink-fitted. The drawings show the actuator device 24 and driving gear 16 to be disposed in an operative, or driving position. In moving the actuator device 24 and driving gear 16 to such a position, a force is directed coaxially of the pulley shaft 14, being applied to the closed end 72 of the actuator device by means of a push rod member 76. This push rod member 76 is part of an activating lever assembly indicated overall at 25. The axially directed force generated by the push rod 76 is sufficiently large to overcome the spring force of compression spring 58. Driving gear 16 is therefore moved axially of the pulley shaft 14 to bring the dogs 56 and 60 into operative engagement. In this way, the driving gear 16 is drivingly coupled to the clutch mechanism 22. In that condition, a torque derived from the source of power which causes pulley shaft 14 to rotate is transmitted through the gear box and clutch assembly 10 the main shaft 20 of the braiding machine 11. Some of the gear train associated with the braiding machine 11 is indicated at 77, in FIG. 2. Moreover, FIG. 2 also shows a bottom plate 79 of the braiding machine 11 which serves to pivotally support the activating lever assembly 25 by means of pivot pin 80.

It is known that in the operation of a conventional braiding machine, the machine is normally started up at the beginning of the "working day or shift" by an operator who manipulates the activating lever assembly 25. In so doing, the push rod member 76 is caused to develop a force pushing against the closed end 72 of actuator device 24, which in turn causes the driving gear 16 to be moved a short distance axially on the pulley shaft 14. The driving gear 16 is thus brought into engagement with the clutch mechanism 22, more specifically, the dogs 56 and 60 being brought into operative engagement. Once the gear 16 has been drivingly coupled to the clutch mechanism 22, it will be apparent that the main shaft 20 of braiding machine 11 will have been drivingly coupled to the power source that turns pulley shaft 14.

Since the operation of a braiding machine such as that shown at 11 is well known in this art, it need not be described in detail here. It will suffice, therefore, to merely indicate that in the normal operation of the braiding machine, thread is taken from a number of bobbins suitably supported upon work table 27, and braided together to form braiding. If for some reason the tension in one or more of the threads increases excessively, the thread will break. In that situation, it is highly desirable to immediately stop the braiding machine. In other words, the gear box and clutch assembly 10 should automatically disengage the main shaft 20 of braiding machine 11 from the source from which power is being derived. Hence, although it is beyond the scope of the present invention, it will be recognized that a mechanism is frequently provided which will release the force of the activating lever assembly 25 that maintains actuator device 24 and driving gear 16 in their operative positions. Accordingly, upon breakage of a thread that mechanism will trip the activating lever assembly 25 and enable the axially directed force component being generated by the driving and driven helical gears 16 and 18, assisted by the spring force of spring 58 to disengage the dogs 56 and 60 on the driving gear and clutch mechanism 52. As indicated previously, when that happens, the driving gear 16 slides axially of pulley shaft 14 only a distance sufficient to disengage the dogs 56 and 60, but not sufficient to disengage the gears 16 and 18.

It has also been indicated previously that within the context of this invention, actuator device 24 uniformly applies a force to the face of the driving gear 16 concentrically thereof, to move the latter into its operative and driving position. Simultaneously, the thrust bearing 66 which is preferably carried by the actuator device 24 absorbs and restrains the axially directed load generated by the driving engagement of the spiral or helical gears 16 and 18. In this way, whenever driving gear 16 is being moved axially of the pulley shaft 14, either to bring it into engagement with, or to disengage it from, the clutch mechanism 24, the loads causing that movement are applied concentrically of the gear. In other words, there is no eccentric loading of the driving gear 16, as was the case in the prior art. This lack of any eccentric loading is very important, and beneficial since uneven or non-uniform loading of the bronze bushing 64, for example, or of the thrust bearing 66, eliminates any tendency for excessive wear and failure due to concentrated loads. As a result, the gears and the bearings in the present gear box and clutch assembly 10 will have a much longer working life. Such improved performance of the present gear box and clutch assembly 10 can be achieved irrespective of how frequently the braiding machine 11 is started up or shut down either accidentally or intentionally, or, for all practical purposes, for how long a period of time the braiding machine 11 continues to run. For maximum efficiency in the production of braided material, it is desirable to keep the braiding machine 11 running as long as possible.

The present gear box and clutch assembly 10 represent a substantial improvement over prior art devices. A firm and stable mounting of the pulley shaft 14 is provided by the ball bearing 38 and bronze bushings 40 and 42 provided at generally opposite ends of that shaft. Moreover, a thrust bearing is provided in such a position and location that in at least the preferred embodiment of this invention, no additional retaining means are needed to hold that thrust bearing in place. The same applies to the ball bearing 38 which is seated within a recess formed in the gear box housing 12, and thus eliminates the need for a separate retaining ring or other securing means.

The present gear box and clutch assembly 10 can very readily be assembled. With reference once again to FIGS. 2 or 3, consider that the present assembly 10 is in an unassembled form. Starting from that, the ball bearing 38 is initially pressed into the recess provided in the gear box housing 12 to receive the same. Next the bronze bushing 42 is press-fitted into the gear box housing 12 and line reamed. The lower race of the thrust bearing 66 is then pressed onto the step retaining the same on the flange 74 of the actuator device 24. The interior bronze bushing 40 is then pressed into the blind borehole from the open end 70 of actuator device 24. This device 24 is then installed in its bearing, the bronze bushing 42, with a sliding fit. The bronze bushing 62 is next press-fitted into the central opening of the driving gear 16, and is reamed square and concentric with the gear and flange 64. The top race of thrust bearing 66 is then press fitted onto the flange 64 of the bronze bushing 62. These parts can now be assembled into the gear box housing 12. A quick manual check for free rotation of the pulley shaft 14, of sliding motion of the actuator device 24, and proper engagement and disengagement of the dogs 56 and 60 on clutch assembly 22 and driving gear 18 is then carried out. Assuming everything to be in order, the retaining pin 54 is then tapped into position, and the pulley 32 fastened to the enlarged end 30 of the pulley shaft 14. The gasket 44 is then provided and positioned on the open face of the gear box housing 12, and attached to Plate 79. Suitable oil or grease for lubricating purposes can be provided either during or after assembly of the gear box and clutch assembly 10.

In disassembling the present gear box and clutch assembly 10, either for replacement of the same or for routine maintenance to any of the interior parts thereof, a procedure which is essentially the reverse of the steps outlined above will be carried out. Hence, it will be apparent that the design and assembly of the present gear box and clutch assembly 10 embodies several advantageous features, without sacrificing the very important features of ease of assembly and operation.

It is to be noted that the present invention has been described particularly in the context of a braiding machine. The reader will recognize, however, that other areas of use are also possible in a drilling machine, or any other type of machine in which the selective coupling of a shaft and power source is desired.

The foregoing disclosure has made reference specifically to one preferred embodiment encompassed within the spirit of this invention. Some suggestions have also been made for modifications thereto. All such modifications and changes as will be apparent to those skilled in this art are intended to be encompassed by this invention, as defined in the claims below.

I claim:

1. A gear box and clutch assembly adapted to selectively drive the main shaft of a machine, from a driving end thereof; comprising a gear-box housing for enclosing the driving end of said main shaft and a driven gear fixedly secured thereto, the driven gear being rotatable with the main shaft, said housing having an aligned pair of openings in opposite walls thereof, and also enclosing a pulley shaft with opposite ends of the pulley shaft being adapted to be rotatably supported in an associated one of the aligned openings, one end of the pulley shaft being adapted to be rotatably driven from a source of power; a driving gear mounted on the pulley shaft to be movable both rotatably and axially relative thereto, the driving gear being continuously in engagement with said driven gear on the main shaft; a clutch mechanism for interconnecting the driving gear and pulley shaft in driving relation, the clutch mechanism being fixedly secured to the pulley shaft to be rotatable therewith, said clutch mechanism being adapted to be coupled operatively to said driving gear; and a tube-like actuator device having a blind opening in one end thereof, the actuator device being movably mounted in first bearing means disposed in the aligned opening opposite the driven end of the pulley shaft, the actuator device also carrying second bearing means in the blind opening, the second bearing means surrounding the other end of the pulley shaft for rotatably supporting the same, said blind opening having a depth sufficient to accommodate movement of the actuator device coaxially of the pulley shaft, such movement being selectively provided by an operator and causing a force to be applied uniformly over one face of the driving gear to move said driving gear into coupled engagement with said clutch mechanism, thereby selectively drivingly connecting said main shaft to the source of power.

2. The combination of claim 1, wherein the driven gear is a spiral worm gear that generates a force component acting on the driving gear in a direction coaxially of the pulley shaft, and wherein said actuator device is provided with a thrust bearing thereon interiorly of the gear box for resisting said force component.

3. The combination of claim 2, wherein the actuator device causes a uniformly applied force to be exerted on the driving gear concentrically thereof to bring said gear into engagement with the clutch mechanism, the thrust bearing carried by the actuator engaging an annular area concentrically of the mating face of the driving gear.

4. In a gear box and clutch assembly adapted to selectively transmit a torque from a source of power to a rotatable main shaft of a braiding machine, one end of said main shaft carrying a driven gear fixed to rotate therewith and disposed within a gear box housing, a pulley shaft having opposite ends rotatably supported in aligned openings in said housing with one end thereof adapted to be coupled to said source of power, the pulley shaft supporting a clutch mechanism thereon and a driving gear that is in engagement with said driven gear as well as being movable axially and rotatably relative to said pulley shaft to be engageable with the clutch mechanism; wherein there is provided an actuator device that is selectively actuatable to cause operative coupling of the driving and driven gears through the clutch mechanism to the source of power, thereby enabling said transmission of torque, the actuator device having a tube-like form with a closed outwardly facing end and a blind borehole defining an open inwardly facing end, said device being supported in first bearing means in a related one of the aligned openings for movement co-axially of the pulley shaft, the blind borehole being adapted to contain second bearing means which surround and rotatably support the other end of said pulley shaft, the movement co-axially of the pulley shaft causing a force to be applied uniformly over one face of said driving gear bringing said gear into engagement with the clutch mechanism.

* * * * *